(12) United States Patent
Liu et al.

(10) Patent No.: US 11,394,450 B2
(45) Date of Patent: Jul. 19, 2022

(54) INPUT DATA VALUE AND BEAM INDEX FILTERING IN LTE AND 5G BASE STATIONS

(71) Applicant: Telefonaktiebolaget LM Ericsson (publ), Stockholm (SE)

(72) Inventors: Qingchao Liu, Ottawa (CA); Xixian Chen, Ottawa (CA); Edward Mah, Kanata (CA); Yashar Nezami, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/274,996

(22) PCT Filed: Sep. 10, 2018

(86) PCT No.: PCT/IB2018/056898
§ 371 (c)(1),
(2) Date: Mar. 10, 2021

(87) PCT Pub. No.: WO2020/053622
PCT Pub. Date: Mar. 19, 2020

(65) Prior Publication Data
US 2022/0060239 A1    Feb. 24, 2022

(51) Int. Cl.
*H04B 7/06*     (2006.01)
*H04B 7/0413*   (2017.01)

(52) U.S. Cl.
CPC ......... *H04B 7/0695* (2013.01); *H04B 7/0617* (2013.01); *H04B 7/0639* (2013.01); *H04B 7/0413* (2013.01)

(58) Field of Classification Search
CPC .. H04B 7/0695; H04B 7/0617; H04B 7/0639; H04B 7/0413
See application file for complete search history.

(56) References Cited

U.S. PATENT DOCUMENTS

2004/0190451 A1    9/2004  Dacosta
2008/0318606 A1*  12/2008  Tsutsui ................. H04B 7/0413
                                                 455/500

(Continued)

OTHER PUBLICATIONS

Author Unknown, "Technical Specification Group Radio Access Network; NR; Physical layer procedures for data (Release 15)," Technical Specification 38.214, Version 15.2.0, 3GPP Organizational Partners, Jun. 2018, 95 pages.

(Continued)

*Primary Examiner* — Kenneth T Lam
(74) *Attorney, Agent, or Firm* — Sage Patent Group

(57) ABSTRACT

Methods and systems for Long Term Evolution (LTE) and Fifth Generation (5G) beam index filtering are presented. According to one aspect, a method for beam index filtering comprises receiving a beam index that was estimated based on information received from a User Equipment (UE); storing the received beam index into a queue of length N for storing received beam indexes, N being greater than one; selecting a beam index from the queue according to a filtering algorithm; and using the selected beam index for transmissions to the UE. In one embodiment, a majority vote algorithm is employed to select the beam index that appears most often in the queue. Where there is a tie between two or more beam indexes, the beam index that was most recently added to the queue is selected. The same concepts may be applied to filter input data or parameters other than beam indexes.

21 Claims, 12 Drawing Sheets

(56) References Cited

U.S. PATENT DOCUMENTS

| | | | |
|---|---|---|---|
| 2014/0059058 A1 | 2/2014 | Ohtsuki et al. | |
| 2017/0163392 A1 | 6/2017 | Lim et al. | |
| 2017/0353870 A1* | 12/2017 | Rybakowski | H04B 7/024 |
| 2021/0028847 A1* | 1/2021 | Bedekar | H04B 7/0695 |

OTHER PUBLICATIONS

Ji, Hyoungju, et al., "Overview of Full-Dimension MIMO in LTE-Advanced Pro," To appear in IEEE Communications Magazine, Aug. 10, 2016, 22 pages, URL: https://arxiv.org/pdf/1601.00019.pdf.

International Search Report and Written Opinion for International Patent Application No. PCT/IB2018/056898, dated May 17, 2019, 14 pages.

\* cited by examiner

The Median N Filter Structure with N = 9

*Weighted Vote Algorithm*

INPUT DATA VALUE AND BEAM INDEX FILTERING IN LTE AND 5G BASE STATIONS

This application is a 35 U.S.C. § 371 national phase filing of International Application No. PCT/IB2018/056898, filed Sep. 10, 2018, the disclosure of which is incorporated herein by reference in its entirety.

TECHNICAL FIELD

The present disclosure relates to Massive-Multiple Input Multiple Output (M-MIMO) communications, and particularly to selection of a beam index to be used for transmissions that use beamforming.

BACKGROUND

In both Long Term Evolution (LTE) and Fifth Generation (5G) standards, Multiple Input Multiple Output (MIMO) antenna technologies play an essential role in improving system capacity. It not only enhances the conventional point-to-point link, but also enables new types of links such as multiuser MIMO. A large family of MIMO techniques has been developed for various links and with various amounts of available channel state information in both LTE and 5G.

Channel State Information (CSI) at the network side is indispensable to fully exploit the potential of such complex multiple antennas techniques. In a Frequency Division Duplexing (FDD) system, the User Equipment (UE) provides the network side with quantized CSI through a feedback channel, which can occupy a significant portion of Uplink (UL) capacity. Fortunately, in a Time Division Duplexing (TDD) system, UL and Downlink (DL) channels are reciprocal, i.e., channel reciprocity holds. To be specific, in a cellular TDD system, the UL channel and the DL channel are the same. Channel reciprocity comes from the fact that propagation of electromagnetic wave is reversible, i.e., if the electromagnetic wave is arriving at point B from point A through a specific path, the electromagnetic wave emitted at point B can arrive at point A through the same path. The same traveling path suggests that path attenuation, delay, and phase offset are the same. In a wireless communication system, this implies that the channel from A to B is the same as the channel from B to A. Thus, in a TDD system, channel reciprocity can be used to reduce the feedback overhead. It is a promising direction of advanced MIMO techniques. When perfect CSI is available at the transmitter, linear precoding can be used to increase spectrum efficiency or enhance link reliability.

Assumption of perfect CSI at the transmitter is often unrealistic, however. In some practical systems, CSI is sent to the transmitter through a finite rate feedback channel. The receiver usually selects the best precoder from a codebook, which is designed in advance and stored at both the transmitter and the receiver. The index of the selected precoder (which may be a quantized precoder) is then sent to the transmitter through the feedback channel. The feedback would occupy a certain portion of the scarce UL resources, which decreases spectrum efficiency of UL transmissions. Since the capacity of the UL channel is limited, quantization error inevitably exists. Quantization error would degrade the gain of closed loop linear precoding.

To obtain UL CSI, UEs are scheduled to transmit pilot signals at predetermined times and using predetermined frequency tones. The base station then estimates the UL channel based on the received pilot signals. In commercial wireless communication systems, such as LTE, the UL pilot signal is called a Sounding Reference Signal (SRS). The SRS signal is transmitted periodically over a bandwidth indicated by the base station. If the SRS is not available, an alternative is to use a Demodulation Reference Signal (DMRS) as the UL pilot signal when PUSCH is transmitted.

After obtaining the estimated UL channel, the base station can use it to calculate the DL beam index as well as its corresponding precoding matrix (beamforming weights). Alternatively, the UE may estimate the beam index and report it to the base station with CSI reporting. Beamforming improves network coverage and cell-edge throughput by increasing the range of signals, improving signal gain, and reducing interference.

Problems with Existing Solutions

As discussed in the previous section, the existing solutions either obtain the beam index and its corresponding weights from the UE's feedback channel in an FDD system, or derive them from the UL pilot channel in a TDD system using channel reciprocal property. In both FDD and TDD systems, noise, interference, and other channel impairments can cause the obtained beam index to fluctuate and, as a result, the beam index may not be reliable, e.g., the beam index so obtained may not accurately reflect the channel condition. As a result, the system capacity may be reduced, e.g., because the network used a wrong beam index to do DL transmission which has lower channel quality than the correct beam index.

SUMMARY

In the enclosed embodiments, a new beam index filtering algorithm is proposed on top of the existing solutions, which can make the selection of beam index more robust and improve the system capacity.

Methods and systems for Long Term Evolution (LTE) and Fifth Generation (5G) beam index filtering are presented. According to one aspect, a method for beam index filtering comprises receiving a beam index for a User Equipment (UE); storing the received beam index into a queue that stores N number of estimated beam indexes, N being greater than one; selecting a beam index from the queue according to a filtering algorithm; and using the selected beam index for transmissions to the UE. In one embodiment, a majority vote algorithm is employed to select the beam index that appears most often in the queue. Where there is a tie between two or more beam indexes, the beam index that was most recently added to the queue is selected. The same concepts may be applied to filter parameters other than beam indexes.

According to one aspect of the present disclosure, a method, performed in a base station in a telecommunications network, for beam index filtering, comprises: receiving an estimated beam index that was estimated based on information received from a UE; storing the received beam index into a queue of length N for storing received beam indexes, N being greater than one; selecting a beam index from the queue according to a filtering algorithm; and using the selected beam index for transmissions to the UE.

In some embodiments, storing the received beam index into a queue of length N for storing received beam indexes comprises storing the estimated beam index into a First-In, First-Out (FIFO) of length N.

In some embodiments, selecting the beam index comprises selecting the beam index that appears most often in the queue.

In some embodiments, selecting the beam index comprises determining that more than one beam index appears most often in the queue and selecting, from those beam indexes that appear most often in the queue, the beam index that was most recently added to the queue.

In some embodiments, each entry within the queue is assigned a corresponding weight, and selecting the beam index comprises: for each entry in the queue, determining the beam index value in that entry, and incrementing a count of the number of times that the beam index value has appeared in the queue during this selection step according to the corresponding weight for that entry; and after all entries in the queue have been processed, selecting the beam index with the highest count.

In some embodiments, incrementing the count comprises incrementing the count by a value corresponding to a weight assigned to the queue entry currently being processed.

In some embodiments, each queue entry has the same weight.

In some embodiments, at least one queue entry has a different weight than another queue entry.

In some embodiments, a newer queue entry has a higher weight than an older queue entry.

In some embodiments, the method further comprises modifying the weight assigned to at least one of the entries within the queue.

In some embodiments, modifying the weight assigned to at least one of the entries within the queue comprises dynamically modifying the weight based on channel conditions.

In some embodiments, dynamically modifying the weight based on channel conditions comprises dynamically modifying the weight based on movement of the UE.

In some embodiments, the method further comprises initializing the queue prior to storing the received beam index into the queue.

In some embodiments, initializing the queue comprises setting each queue entry to an initialization value.

In some embodiments, setting each queue entry to an initialization value comprises setting each queue entry to a value that is not a value beam index value and wherein the initialization values are ignored during the selection step.

In some embodiments, N=9.

In some embodiments, the method further comprises dynamically changing the length N of the queue based on channel conditions.

In some embodiments, dynamically changing the length N of the queue based on channel conditions comprises dynamically changing the length N of the queue based on movement of UE.

In some embodiments, receiving the beam index comprises receiving the beam index that was reported from the UE.

In some embodiments, receiving the beam index comprises receiving the beam index that was calculated by the base station based on signals received from the UE.

According to another aspect of the present disclosure, a base station configured to communicate with a UE comprises a radio interface and processing circuitry configured to: receive a beam index for the UE; store the received beam index into a queue of length N for storing received beam indexes, N being greater than one; select a beam index from the queue according to a filtering algorithm; and use the selected beam index for transmissions to the UE.

In some embodiments, in order to store the received beam index into a queue of length N for storing received beam indexes, the processing circuitry is configured to store the estimated received beam index into a First-In, First-Out, FIFO, of length N.

In some embodiments, the processing circuitry is configured to select a beam index that appears most often in the queue.

In some embodiments, in order to select the beam index that appears most often in the queue, the processing circuitry is further configured to determine that more than one beam index appears most often in the queue and to select, from those beam indexes, a beam index that was most recently added to the queue.

In some embodiments, the processing circuitry is further configured to assign a corresponding weight to each entry within the queue and wherein, in order to select the beam index, the processing circuitry is further configured to: for each entry in the queue, determining a beam index value in that entry, and incrementing a count of a number of times that the beam index value has appeared in the queue during the selection step according to the corresponding weight for that entry; and after all entries in the queue have been processed, selecting a beam index with a highest count.

In some embodiments, in order to increment the count, the processing circuitry is configured to increment the count by a value corresponding to a weight assigned to the queue entry currently being processed.

In some embodiments, each queue entry has a same weight.

In some embodiments, at least one queue entry has a different weight than another queue entry.

In some embodiments, a newer queue entry has a higher weight than an older queue entry.

In some embodiments, the processing circuitry is further configured to modify the weight assigned to at least one of the entries within the queue.

In some embodiments, in order to modify the weight assigned to at least one of the entries within the queue, the processing circuitry is further configured to dynamically modify the weight based on channel conditions.

In some embodiments, in order to dynamically modify the weight based on channel conditions, the processing circuitry is configured to dynamically modify the weight based on movement of the UE.

In some embodiments, the processing circuitry is further configured to initialize the queue prior to storing the received beam index into the queue.

In some embodiments, in order to initialize the queue, the processing circuitry is further configured to set each queue entry to an initialization value.

In some embodiments, in order to set each queue entry to an initialization value, the processing circuitry is further configured to set each queue entry to a value that is not a beam index value and wherein the processing circuitry is further configured to ignore the initialization values during the selection step.

In some embodiments, N=9.

In some embodiments, the processing circuitry is further configured to dynamically change the length of the queue N based on channel conditions.

In some embodiments, in order to dynamically change the length of the queue N based on channel conditions, the processing circuitry is further configured to dynamically change the length of the queue N based on movement of the UE.

In some embodiments, in order to receive the beam index, the processing circuitry is configured to receive the beam index that was reported from the UE.

In some embodiments, in order to receive the beam index, the processing circuitry if configured to receive the beam index that was calculated by the base station based on signals received by the UE.

According to another aspect of the present disclosure, a method for input data filtering, performed in a base station in a telecommunications network, comprises receiving an input data value, storing the received input data value into a queue of length N for storing received input data values, N being greater than one, calculating a filtered input data value based on a content of the queue according to a filtering algorithm, and using the filtered input data value for communications with a UE.

In some embodiments, calculating the filtered input data value based on the contents of the queue according to the filtering algorithm comprises selecting an input data value that appears most often in the queue.

In some embodiments, calculating the filtered input data value based on a content of the queue comprises determining that more than one input data value appears most often in the queue and selecting, from those input data values that appear most often in the queue, an input data value that was most recently added to the queue.

In some embodiments, calculating the filtered input data value based on a content of the queue according to the filtering algorithm comprises performing a mathematical function using at least some of the input data values present in the queue as inputs to the mathematical function.

In some embodiments, performing the mathematical function comprises at least one of: calculating an average of the input data values present in the queue; calculating a weighted average of the input data values present in the queue; calculating a trend of the input data values present in the queue; and identifying and excluding an outlier within the input data values present in the queue.

According to another aspect of the present disclosure, a base station configured to communicate with a UE comprises a radio interface and processing circuitry configured to receive an input data value, store the received input data value into a queue of length N for storing received input data values, N being greater than one, calculate a filtered input data value based on a content of the queue according to a filtering algorithm, and use the filtered input data value for communications with the UE.

In some embodiments, in order to calculate the filtered input data value based on a content of the queue according to the filtering algorithm, the processing circuitry is configured to select an input data value that appears most often in the queue.

In some embodiments, in order to calculate the filtered input data value based on a content of the queue according to the filtering algorithm, the processing circuitry is further configured to determine that more than one input data value appears most often in the queue, and to select, from those input data values that appear most often in the queue, an input data value that was most recently added to the queue.

In some embodiments, in order to calculate the filtered input data value based on a content of the queue according to the filtering algorithm, the processing circuitry is further configured to perform a mathematical function using at least some of the input data values present in the queue as inputs to the mathematical function.

In some embodiments, in order to perform the mathematical function, the processing circuitry is further configured to at least one of: calculate an average of the input data values present in the queue; calculate a weighted average of the input data values present in the queue; calculate a trend of the input data values present in the queue; and identify and exclude an outlier within the input data values present in the queue.

Advantages of the Proposed Solution

The subject matter of the present disclosure provides several advantages over conventional methods and systems. The use of a filter that uses a series of beam indexes estimated over a period of time produces a beam index selection that is less susceptible to transient interference and that more accurately follows long-term changes in channel conditions. The use of a filter makes the selection of beam index more robust and thus improves the system capacity, and also helps reduce fluctuations in the beam index, which is especially beneficial for over the air driving tests or other scenarios where the UE is in motion. In lab tests, this approach resulted in a 12% improvement in DL cell throughput over existing solutions. In field tests, this approach resulted in a 30% improvement in cell throughput compared to existing solutions. These improvements in performance were due in large part to a higher Modulation and Coding Scheme (MCS) index and a lower Block Error Rate (BLER) that resulted from proper selection of optimal beam indexes by the filtering algorithm. Moreover, for this solution, the computation complexity to select the best beam for transmission is relatively low, yet provides substantial improvements in performance.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) Base Station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 1A:
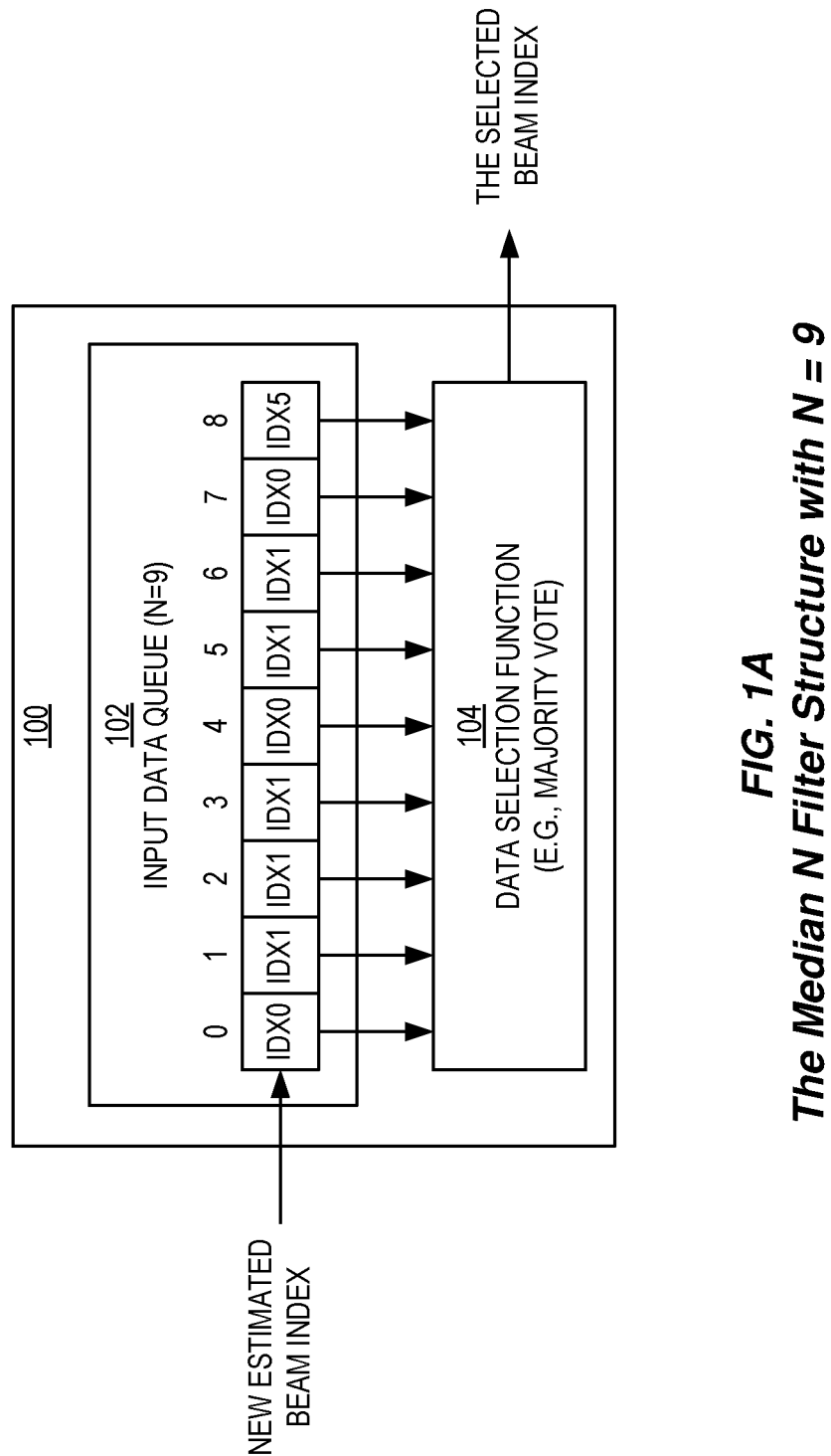
FIGS. 1A and 1B illustrate exemplary systems of Long Term Evolution (LTE) and Fifth Generation (5G) beam index filtering according to some embodiments of the present disclosure.

FIG. 1A illustrates an exemplary system for LTE and 5G beam index filtering according to some embodiments of the present disclosure. In the embodiment illustrated in FIG. 1A, a filter 100 includes an input data queue 102 and a data selection module 104. In the embodiment illustrated in FIG. 1A, the filter 100 periodically receives beam indexes estimated by conventional means (such as where the base station estimates the beam index for a UE based on a received pilot signal, e.g., a Sounding Reference Signal (SRS) or a Demodulation Reference Signal (DMRS), or where the base station obtains a beam index from CSI reporting by a UE), stores the most recent N number of estimated beam indexes, selects a beam index based on a filtering algorithm, and outputs the selected beam index. The selected beam indexes periodically output by the filter 100 have been filtered to remove or reduce the effects of noise and interference on the estimation of beam indexes by conventional means.

In the embodiment illustrated in FIG. 1A, the filter 100 periodically receives a new input data value and stores the new input data value in the input data queue 102. In one embodiment, the input data queue 102 may be a First-In, First-Out (FIFO) data queue, meaning that the N most recently received input data values move through the FIFO (from left to right in FIG. 1A) and the N+1$^{st}$ input data value is discarded. Although the embodiments illustrated in FIG. 1A and described herein receive and process estimated beam indexes, the same concepts may be applied to other types of data. Likewise, although the embodiment illustrated in FIG. 1A is for a value of N=9, other values of N are also contemplated. Moreover, as will be described in more detail below, in some embodiments the value of N used may be variable, e.g., the value of N used may dynamically change over time, such as in response to channel conditions, for example. In some embodiments, the filter 100 receives a series of estimated beam indexes that represent the same channel at different times. If the UE stays in the same location and the channel condition does not change (e.g., there is no noise), all of the estimated beam indexes would be the same value. On the other hand, if the UE is experiencing variable channel conditions (e.g., because the UE is moving or experiencing noise), the estimated beam indexes may be different. In this scenario, the filter tries to select the optimum beam index, which gives the best performance.

In the embodiment illustrated in FIG. 1A, N=9, and so the input data queue 102 has 9 queue slots labeled "queue slot 0" through "queue slot 8," which may be abbreviated as Q[0] through Q[8]. When a new estimated beam index is put into queue slot 0, the previous value in queue slot 0 is moved into queue slot 1, the previous value in queue slot 1 is moved into queue slot 2, and so on, with the previous value of queue slot 7 moved into queue slot 8 and the previous value of queue slot 8 discarded.

The data selection module 104 takes as input at least some of the input data values stored in the input data queue 102 and uses them to calculate an output data value. In the embodiment illustrated in FIG. 1A, the data selection module 104 takes as input all N different input data values stored in the input data queue 102 and selects one of the stored values to be output as the output data value. In some embodiments, the data selection module 104 uses a "majority vote" algorithm, i.e., whichever input data value appears most often within the input data queue 102 is selected by the data selection module 104 to be the output data value. In some embodiments, if a set of two or more input data values are tied for the first place, the data selection module 104 will choose the input data value within the set that occurred most recently.

A filter that performs such a function is herein referred to as a "Median N filter." In the embodiment illustrated in FIG. 1A, the Median N filter is used to filter the estimated beam indexes and thus make the selection of a beam index more robust and reduce the beam index fluctuation, especially for over the air driving tests. After obtaining the beam indexes that were generated based on the existing solutions, the beam indexes are filtered by the Median N filter, where N is the number of N most recently estimated beam indexes. The majority vote strategy is used by the Median N filter to select the best beam index for transmission.

Referring to the specific embodiment illustrated in FIG. 1A, for example, N=9, which means that the 9 most recently estimated beam indexes are stored. In the example illustrated in FIG. 1A, the input data queue 102 contains only three different data values: beam index 0 (IDX0), which shows up three times; beam index 1 (IDX1), which shows up five times; and beam index 5 (IDX5), which shows up one time. Using the majority vote algorithm, beam index 1 "wins," and so the data selection module 104 will select IDX1 as the selected beam index that is output by Median 9 filter algorithm.

The operation of the filter structure 100 illustrated in FIG. 1A will now be described using pseudo code. In some embodiments, there are three distinct events that should be handled: (a) system initialization, (b) the arrival of a new input data value, and (c) performance of the selection function to generate an output data value. These three events will now be described in turn.

At system initialization, which may also be referred to herein as "system setup," all N queue slots of the input data queue 102 are set to a value that is used to indicate that the slot contains invalid or uninitialized data. In one embodiment, for example, valid beam index values are integers from 0 to 7, and so a value of "−1" may be used to indicate an uninitialized slot. The following is the pseudo code for this operation:

```
// When initialized:
    int N = 9;
    int[ ] Q = new int[N];
    for(int i=0; i<N; i++) {
        Q[i] = -1;
    }
```

Upon arrival of a new input data value (e.g., when a new estimated beam index value is obtained), the contents of the input data queue 102 are right shifted with Q[8]=Q[7], Q[7]=Q[6], . . . , Q[2]=Q[1], and the most recent estimated beam index is stored in Q[0]. The following is the pseudo code for this operation:

```
// When new estimated beam index is obtained:
    // Right-shift the contents of the queue
    for(int i=N; i>0; i--) {
        Q[i] = Q[i-1];
    }
    // Store new estimated beam index in queue
    Q[0] = newEstimatedBeamIndex;
```

When a Downlink (DL) data is to be scheduled for transmission, the data selection module 104 operates to select the best beam index for the DL transmission. In the embodiment illustrated in FIG. 1A, the data selection module 104 performs a majority vote algorithm to make this selection, i.e., the beam index value with the maximum number of the occurrences in the queue is selected. In case of a tie between two (or more) different beam index values, the more recent beam index value is selected. The following is the pseudo code for this operation:

```
// When DL data is to scheduled for transmission:
// Determine best beam index by majority vote.
    // Create array to store the "vote count", i.e., the
    // number of times each beam index value appeared.
    // A beam index can have one of 8 different values.
    int M = 8;
    int[ ] BeamIndexCount = new int[M];
    // Count the votes, ignoring values of "-1".
    for(int i=0; i<N; i++) {
        int BeamIndex = Q[i];
        if(BeamIndex != -1) {
            BeamIndexCount[BeamIndex]+=1;
        }
    }
    // Select the beam index with the most votes.
    int SelectedBeamIndex = -1;
    for(int i=0; i<M; i++) {
        if(SelectedBeamIndex < BeamIndexCount[i]) {
            SelectedBeamIndex = i;
        }
    }
    // In case of a tie, the more recent beam index value
    // wins.
    for(int i=0; i<N; i++) {
        int BeamIndex = Q[i];
        if(BeamIndex != -1) {
            if(BeamIndexCount[BeamIndex] ==
                BeamIndexCount[SelectedBeamIndex]) {
                SelectedBeamIndex = BeamIndex;
                Break;
            }
        }
    }
```

Thus, in FIG. 1A, a Median N filter design is used to select the best beam index filter: an input data queue 102 is used to store the most recent N estimated beam indexes and a data selection module 104 selects the best beam index using a majority vote algorithm.

In some embodiments, the length of the input data queue 102 may be modified, i.e., the value of N may dynamically change or be changed over time. In one embodiment, where the filter 100 operates to select a beam index, for example, the filter length N may be adjusted in response to detection of the speed of movement of the UE that is providing the channel feedback or other information. The speed of the UE may be derived from Doppler shift measurements, for example. In one embodiment, if it is determined that the UE is moving rapidly, the length of the input data queue 102 may be decreased (N is decreased) to improve the filter's responsiveness to actual, real changes in beam index. Likewise, if it determined that the UE is static or relatively static, the length of the input data queue 102 may be increased (N is increased) to improve the filter's ability to reject transient noise or interference. It should be noted that the length N of the input data queue 102 may be changed or changed over time for reasons other than detection of the speed of movement of a UE, including, but not limited to, changes in cell or channel conditions, a desire to change the filter's responsiveness and/or noise rejection characteristics, or other reasons.

In one embodiment, after obtaining the estimated beam indexes based on the existing solutions, the beam indexes are filtered using a filter algorithm that produces as an output a beam index to be used. In one embodiment, the estimated beam indexes are input into a Median N filter, where N is the number of N most recently estimated beam indexes. In one embodiment, a majority vote strategy is used by the Median N filter to select the best beam index, e.g., the beam index that occurs most often within the N samples is the beam index that is selected for use. In one embodiment, the algorithm is implemented in a sliding window fashion, e.g., where only the latest N estimated beam index values are used.

In the examples above, a majority vote algorithm is used to select a beam index. This algorithm may be implemented using integer values, i.e., without using real numbers or floating point operations, and can be very fast due to the low computational complexity and small resource footprint. However, other algorithms may be used instead. For example, the filter 100 may employ an Infinite Impulse Response (IIR) filter instead of a majority vote algorithm, but IIR uses real (not integer) values, which results in higher computational complexity and/or a larger resource footprint.

Figure 1B:
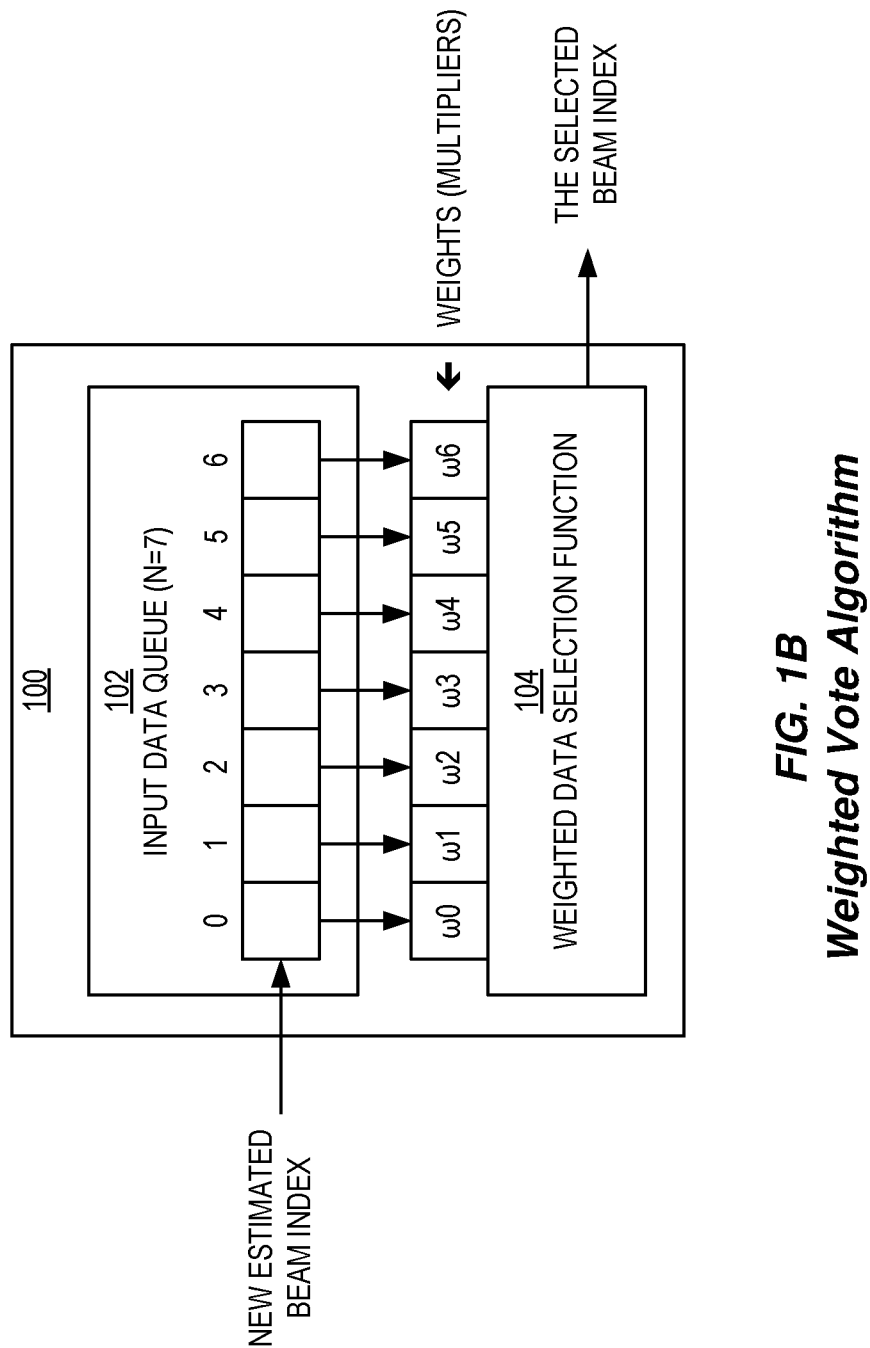

FIG. 1B illustrates another exemplary system of LTE and 5G beam index filtering according to some embodiments of the present disclosure. In the embodiment illustrated in FIG. 1B, the data selection module 104 may employ a weighted majority vote algorithm, e.g., where each of the estimated beam indexes stored in the filtering queue has a corresponding weight, w, depending on its entry location. The weight assigned to the queue entry will be used for calculating the beam index count value by the data selection module 104. In some embodiments, the most recently received input data values are given a higher weight than the least recently received input data values, e.g., $\omega_0 > \omega_1 > \ldots > \omega_5 > \omega_6$. These embodiments have the benefit that careful selection of weights may naturally prevent the occurrence of a tie between two or more values. Such algorithms may require real numbers, i.e., floating point calculations. A fixed point calculation can also be used if the weights are carefully designed.

The following is the Pseudo code for this operation:

```
// When DL data is to scheduled for transmission:
// Determine best beam index by majority vote.
    // Create array to store the "vote count", i.e., the
    // number of times each beam index value appeared.
    // A beam index can have one of 8 different values.
    // Each entry of the filtering queue has its
    // corresponding weight depends on its location and
    // store in an array: w[i], i = 0, 1, 2, ..., N
    int M = 8;
    float[ ] BeamIndexCount = new float[M];
    // Count the votes, ignoring values of "-1".
    for(int i=0; i<N; i++) {
        int BeamIndex = Q[i];
        if(BeamIndex != -1) {
            BeamIndexCount[BeamIndex]+= w[BeamIndex];
        }
    }
    // Select the beam index with the most votes.
    int SelectedBeamIndex = -1;
    for(int i=0; i<M; i++) {
        if(SelectedBeamIndex < BeamIndexCount[i]) {
            SelectedBeamIndex = i;
        }
    }
    //In case of a tie, the more recent beam index value wins.
    for(int i=0; i<N; i++) {
        int BeamIndex = Q[i];
        if(BeamIndex != -1) {
            if(BeamIndexCount[BeamIndex] ==
                BeamIndexCount[SelectedBeamIndex]) {
                SelectedBeamIndex = BeamIndex;
```

```
                Break;
            }
        }
    }
```

In some embodiments, one or more of the weights may be dynamically modified over time, and may be modified in response to changing channel conditions, e.g., due to noise, movement of the UE, or other activity or phenomena that may be occurring. In one embodiment, for example, it may be determined that more recently received beam indexes are beginning to suffer higher than usual levels of variability compared to less recently received beam indexes. This can be an indicator of a recent increase in noise or other interference compared to less recently received beam indexes. In such cases, the weights of the more recently received beam indexes may be decreased in order that the noisy data is less likely to erroneously skew the filter output.

In another embodiment, if a UE is detected to be moving fast, the weights associated with the more recent received beam indexes may be increased in recognition that the more recent beam indexes are more likely to provide an accurate indication of the UE's location compared to older beam indexes. Similarly, the weights associated with the older beam indexes may be reduced. Likewise, then the UE is not moving at all, each entry in the queue may be assigned equal weights.

In some embodiments, both the length N of the input queue and the weights assigned to the queue entries may be changed. For example, in some embodiments, the length N of the input queue and the weights assigned to each respective queue entry may be dynamically changed based on UE movement or other UE condition as well as based on network conditions, external factors, policy factors, or for other reasons.

For some types of data, such as in the case of a beam index, the value selected should be one of the discrete values that were received as input—i.e., the input data selection module 104 should not calculate an average or perform any other mathematical interpolation or extrapolation. However, for other types of data, such mathematical calculations may be appropriate or beneficial; thus, in other embodiments, the filter 100 may perform a different kind of selection function, such as choosing a discrete value that most closely corresponds to the running average of the data stored in the input data queue 102, for example, or a calculation rather than a selection.

Although the examples described herein involve DL transmissions, the proposed methodology may also be applied to Uplink (UL) transmissions or in any application in which input data is susceptible to noise and would benefit from the filtering techniques described herein. Although some of the examples described herein use a queue of length 9 (i.e., N=9), other queue lengths may be used. Although some of the examples described herein involve input data having only one of eight possible values, the same principles may be applied in scenarios where input data can have different numbers of possible values, or can have an infinite number of possible values, etc.

Figure 2:
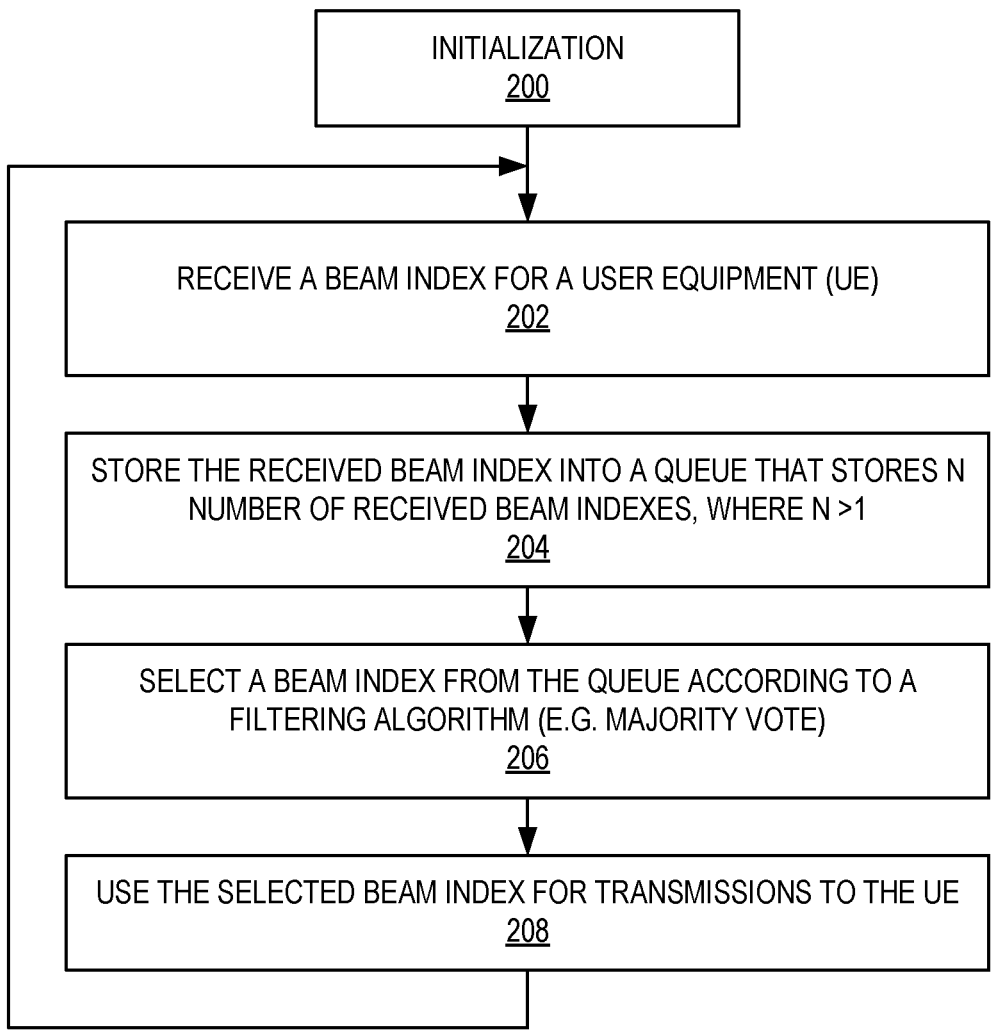
FIG. 2 is a flow chart illustrating an exemplary process for LTE and 5G beam index filtering according to some embodiments of the present disclosure.

FIG. 2 is a flow chart illustrating an exemplary process for LTE and 5G beam index filtering according to some embodiments of the present disclosure. This process will be now described with reference to FIGS. 1A and 2. In the embodiment illustrated in FIG. 2, the process is as follows:

At step 200, an initialization step is performed, during which the data structures used for storing N different input data values is cleared, set to an initial value, or otherwise initialized. In the filter 100 illustrated in FIG. 1A, the input data queue 102 is initialized, e.g., the contents of the queue are cleared or set to some initial or default value. Other initialization steps may be performed in addition to or instead of the steps described above. In some embodiments, this initialization step 200 may be skipped or omitted entirely.

At step 202, an input data value is received. In some embodiments, the filter 100 receives an estimated beam index. In some embodiments, the estimated beam index was generated via conventional means.

At step 204, the received input value is stored into an input data queue that stores N different input data values, such as the input data queue 102 in FIG. 1A. In some embodiments, the input data queue 102 operates as a FIFO.

At step 206, a data selection function is performed using data stored in the input data queue. In some embodiments, the data selection function is performed by the data selection module 104. In some embodiments, the data selection function employs a majority vote algorithm that selects as the output value whichever input value occurred the most often in the input data queue 102. In some embodiments, the data selection function performed by the data selection module 104 ignores queue slots that contain the initial or default value and thus only considers data within queue slots that contain input data values that have been received and stored to the input data queue 102. In some embodiments, the data selection function operates to select one of the input data values as the data value to be output. In some embodiments, the data values stored within the input data queue 102 may be weighted, e.g., multiplied or scaled with weighting factors, as part of the data selection function. In some embodiments, the data value output by the data selection function is the unweighted data value, i.e., the weighted values are used to select an unweighted value to be output.

At step 208, the selected data value is output. The flow then returns to step 202, where the process waits until the next input data value is received, after which it performs steps 204, 206, and 208 and again returns to step 202 and waits. In some embodiments, an initialization trigger event will cause the flow to immediately go to initialization step 200 and continue from there.

Figure 3:
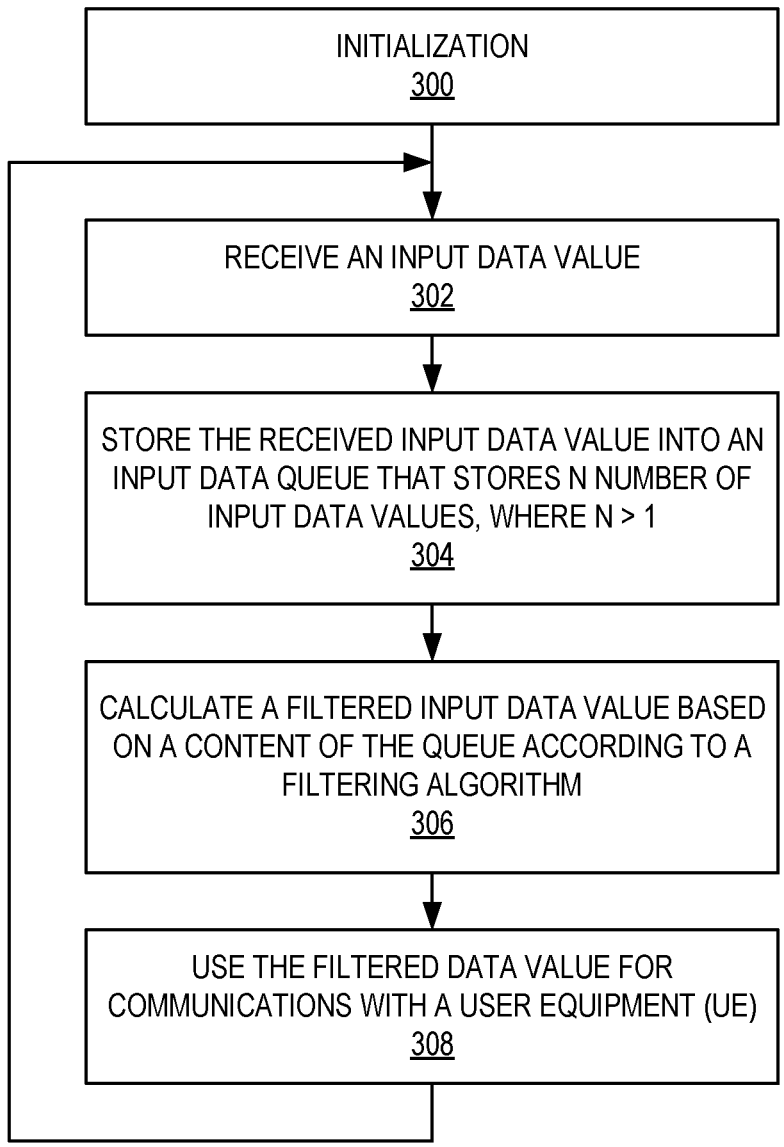
FIG. 3 is a flow chart illustrating an exemplary process for input data filtering according to some embodiments of the present disclosure.

FIG. 3 is a flow chart illustrating an exemplary process for data input filtering according to some embodiments of the present disclosure. This generic process may be used to filter any type of input data, including estimated beam indexes, parameters, or other data types and values. In the embodiment illustrated in FIG. 3, the process is as follows:

At step 300, an initialization step is performed, during which the data structures used for storing N different input data values is cleared, set to an initial value, or otherwise initialized. Other initialization steps may be performed in addition to or instead of the steps described above. In some embodiments, this initialization step 300 may be skipped or omitted entirely.

At step 302, an input data value is received. In some embodiments, the input data comprises a parameter or other data that will be used for communication with a UE. In some embodiments, the parameter or other data is generated or estimated based on information received from or associated with the UE. In some embodiments, the parameter or other data is related to a condition of the UE, a condition of the network in which the UE is operating, and/or a condition of a communication channel between the UE and the network in which the UE is operating. The concepts described herein may likewise be applied to other types of data.

At step 304, the received input value is stored into an input data queue that stores N different input data values (N>1), such as input data queue of length N. In some embodiments, the input data queue operates as a FIFO. In some embodiments, the input data queue stores data values for the same data item (e.g., a parameter, a measured value, etc.) but taken, received, or measured at different points in time. In these embodiments, the input data queue can be considered to be storing a running log (or historical record) of the same data item over a period of time.

At step 306, a filtered input data value is calculated based on a content (or contents) of the input data queue according to a filtering algorithm. In some embodiments, the filtering algorithm comprises a data selection function. In some embodiments, the data selection function is performed by a data selection module. In some embodiments, the data selection function employs a majority vote algorithm that selects as the output value whichever input value occurred the most often in the input data queue. In some embodiments, the data selection function ignores queue slots that contain the initial or default value and thus only considers data within queue slots that contain input data values that have been received and stored to the input data queue. In some embodiments, the data selection function operates to select one of the input data values as the data value to be output. In some embodiments, the data values stored within the input data queue may be weighted, e.g., multiplied or scaled with weighting factors, as part of the data selection function.

In some embodiments, the data value output by the data selection function is the unweighted data value, i.e., the weighted values are used to select an unweighted value to be output. In some embodiments, the filtering algorithm comprises a mathematical function that uses the contents of the queue as inputs to the mathematical function. Examples of mathematical functions used by the filtering algorithm include, but are not limited to, calculation of an average or a weighted average of the data values present within the queue, calculation of a trend over time of the data values present within the queue, and/or identifying and excluding outliers of the data values present within the queue.

At step 308, the filtered data value is used for communications with a UE. In some embodiments, the data value being filtered comprises a parameter for communications with the UE. The flow then returns to step 302, where the process waits until the next input data value is received, after which it performs steps 304, 306, and 308 and again returns to step 302 and waits. In some embodiments, an initialization trigger event will cause the flow to immediately go to initialization step 300 and continue from there.

EXAMPLE EMBODIMENTS

Figure 4:
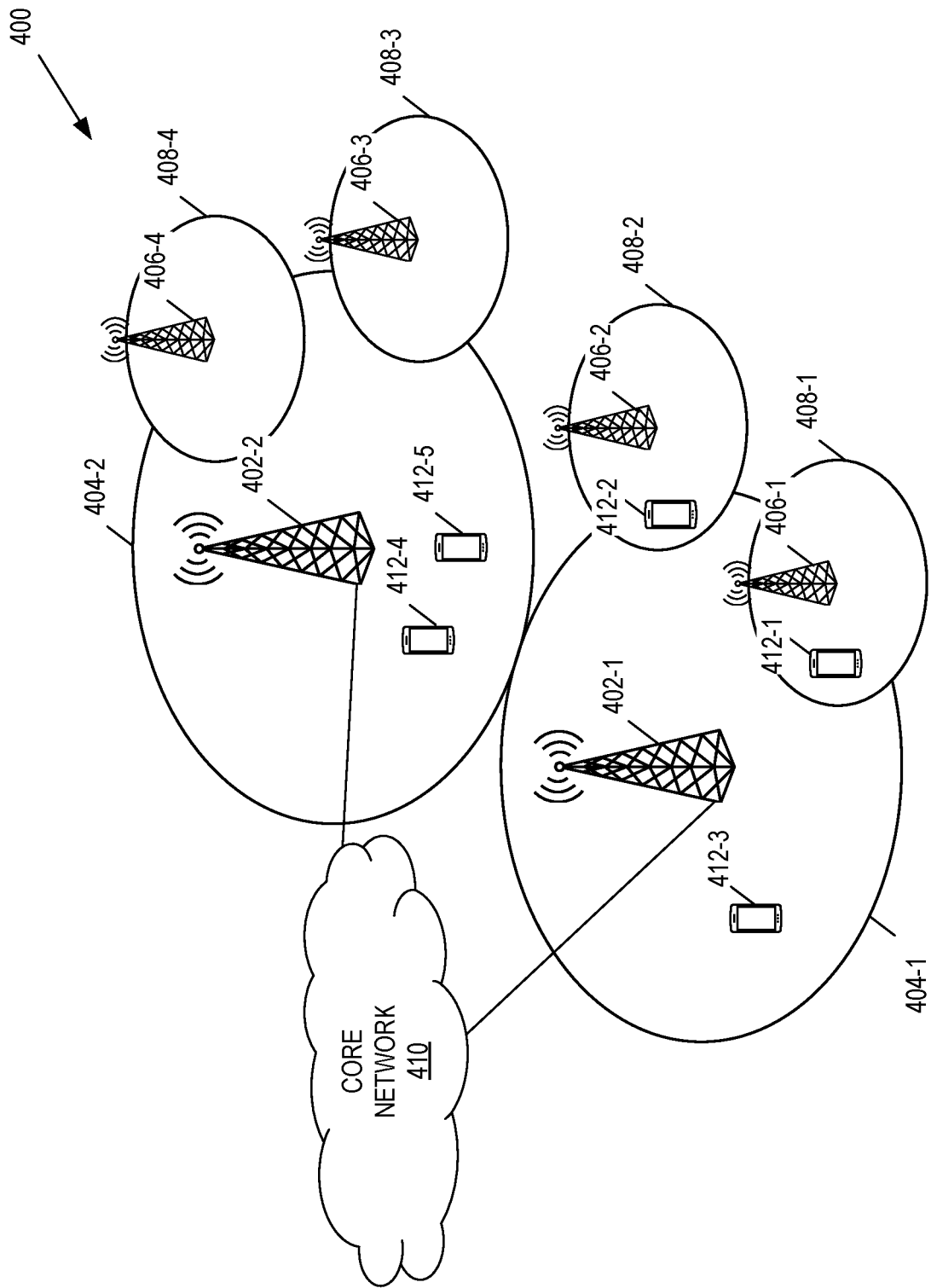
FIG. 4 illustrates one example of a cellular communications network according to some embodiments of the present disclosure.

FIG. 4 illustrates one example of a cellular communications network 400 according to some embodiments of the present disclosure. In the embodiments described herein, the cellular communications network 400 is a 5G NR network. In this example, the cellular communications network 400 includes base stations 402-1 and 402-2, which in LTE are referred to as eNBs and in 5G NR are referred to as gNBs, controlling corresponding macro cells 404-1 and 404-2. The base stations 402-1 and 402-2 are generally referred to herein collectively as base stations 402 and individually as base station 402. Likewise, the macro cells 404-1 and 404-2 are generally referred to herein collectively as macro cells 404 and individually as macro cell 404. The cellular communications network 400 may also include a number of low power nodes 406-1 through 406-4 controlling corresponding small cells 408-1 through 408-4. The low power nodes 406-1 through 406-4 can be small base stations (such as pico or femto base stations) or Remote Radio Heads (RRHs), or the like. Notably, while not illustrated, one or more of the small cells 408-1 through 408-4 may alternatively be provided by the base stations 402. The low power nodes 406-1 through 406-4 are generally referred to herein collectively as low power nodes 406 and individually as low power node 406. Likewise, the small cells 408-1 through 408-4 are generally referred to herein collectively as small cells 408 and individually as small cell 408. The base stations 402 (and optionally the low power nodes 406) are connected to a core network 410.

The base stations 402 and the low power nodes 406 provide service to wireless devices 412-1 through 412-5 in the corresponding cells 404 and 408. The wireless devices 412-1 through 412-5 are generally referred to herein collectively as wireless devices 412 and individually as wireless device 412. The wireless devices 412 are also sometimes referred to herein as UEs.

Figure 5:
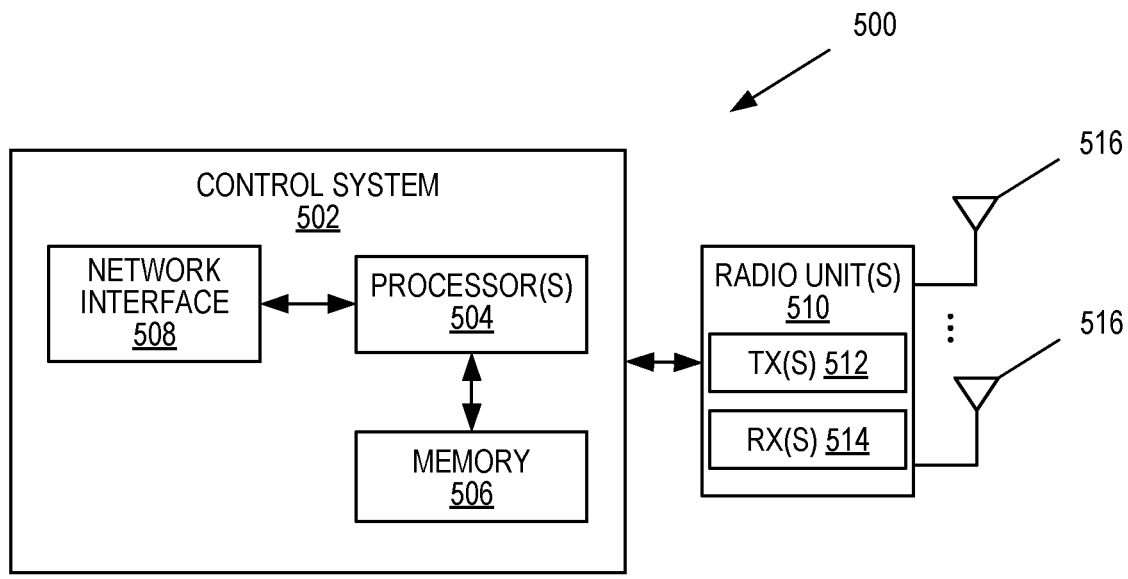
FIG. 5 is a schematic block diagram of a radio access node according to some embodiments of the present disclosure.

FIG. 5 is a schematic block diagram of a radio access node 500 according to some embodiments of the present disclosure. The radio access node 500 may be, for example, a base station 402 or 406. As illustrated, the radio access node 500 includes a control system 502 that includes one or more processors 504 (e.g., Central Processing Units (CPUs), Application Specific Integrated Circuits (ASICs), Field Programmable Gate Arrays (FPGAs), and/or the like), memory 506, and a network interface 508. The one or more processors 504 are also referred to herein as processing circuitry. In addition, the radio access node 500 includes one or more radio units 510 that each includes one or more transmitters 512 and one or more receivers 514 coupled to one or more antennas 516. The radio units 510 may be referred to or be part of radio interface circuitry. In some embodiments, the radio unit(s) 510 is external to the control system 502 and connected to the control system 502 via, e.g., a wired connection (e.g., an optical cable). However, in some other embodiments, the radio unit(s) 510 and potentially the antenna(s) 516 are integrated together with the control system 502. The one or more processors 504 operate to provide one or more functions of a radio access node 500 as described herein. In some embodiments, the function(s) are implemented in software that is stored, e.g., in the memory 506 and executed by the one or more processors 504.

Figure 6:
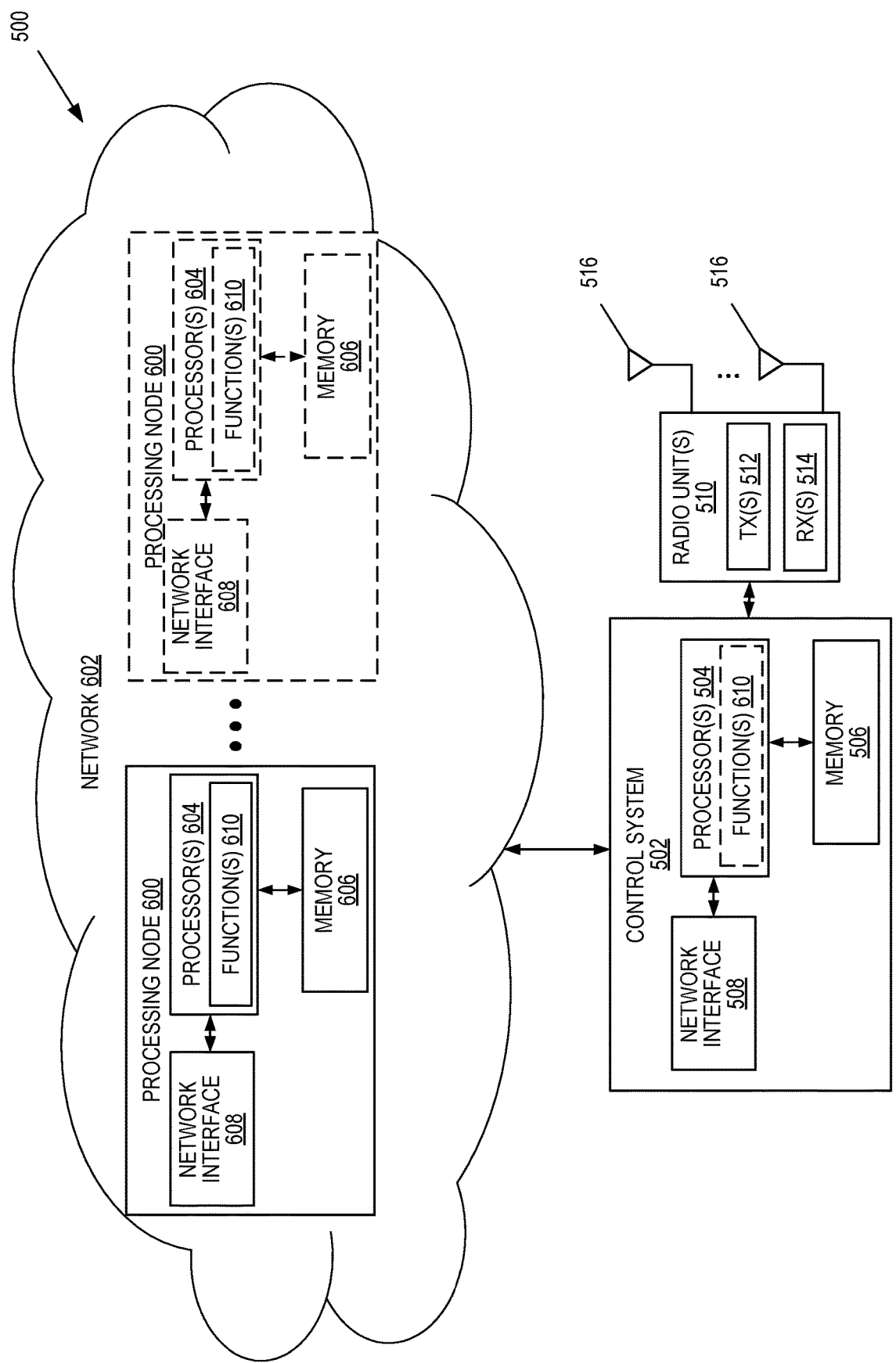
FIG. 6 is a schematic block diagram that illustrates a virtualized embodiment of the radio access node of FIG. 5 according to some embodiments of the present disclosure.

FIG. 6 is a schematic block diagram that illustrates a virtualized embodiment of the radio access node 500 according to some embodiments of the present disclosure. This discussion is equally applicable to other types of network nodes. Further, other types of network nodes may have similar virtualized architectures.

As used herein, a "virtualized" radio access node is an implementation of the radio access node 500 in which at least a portion of the functionality of the radio access node 500 is implemented as a virtual component(s) (e.g., via a virtual machine(s) executing on a physical processing node(s) in a network(s)). As illustrated, in this example, the radio access node 500 includes the control system 502 that includes the one or more processors 504 (e.g., CPUs, ASICs, FPGAs, and/or the like), the memory 506, and the network interface 508 and the one or more radio units 510 that each includes the one or more transmitters 512 and the one or more receivers 514 coupled to the one or more antennas 516, as described above. The control system 502 is connected to the radio unit(s) 510 via, for example, an optical cable or the like. The control system 502 is connected to one or more processing nodes 600 coupled to or included as part of a network(s) 602 via the network interface 508. Each processing node 600 includes one or more processors 604 (e.g., CPUs, ASICs, FPGAs, and/or the like), memory 606, and a network interface 608.

In this example, functions 610 of the radio access node 500 described herein are implemented at the one or more processing nodes 600 or distributed across the control system 502 and the one or more processing nodes 600 in any desired manner. In some particular embodiments, some or all of the functions 610 of the radio access node 500 described herein are implemented as virtual components executed by one or more virtual machines implemented in a virtual environment(s) hosted by the processing node(s) 600. As will be appreciated by one of ordinary skill in the art, additional signaling or communication between the processing node(s) 600 and the control system 502 is used in order to carry out at least some of the desired functions 610. Notably, in some embodiments, the control system 502 may not be included, in which case the radio unit(s) 510 communicate directly with the processing node(s) 600 via an appropriate network interface(s).

In some embodiments, a computer program including instructions which, when executed by at least one processor, causes the at least one processor to carry out the functionality of radio access node 500 or a node (e.g., a processing node 600) implementing one or more of the functions 610 of the radio access node 500 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 7:
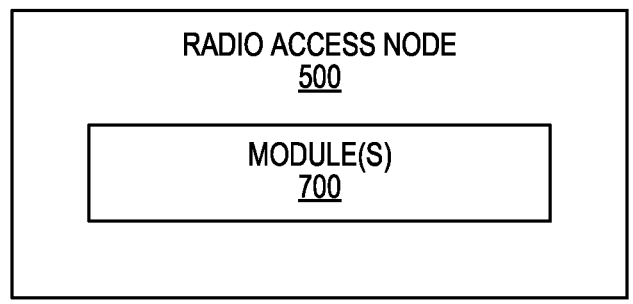
FIG. 7 is a schematic block diagram of the radio access node of FIG. 5 according to some other embodiments of the present disclosure.

FIG. 7 is a schematic block diagram of the radio access node 500 according to some other embodiments of the present disclosure. The radio access node 500 includes one or more modules 700, each of which is implemented in software. The module(s) 700 provide the functionality of the radio access node 500 described herein. This discussion is equally applicable to the processing node 600 of FIG. 6 where the modules 700 may be implemented at one of the processing nodes 600 or distributed across multiple processing nodes 600 and/or distributed across the processing node(s) 600 and the control system 502.

Figure 8:
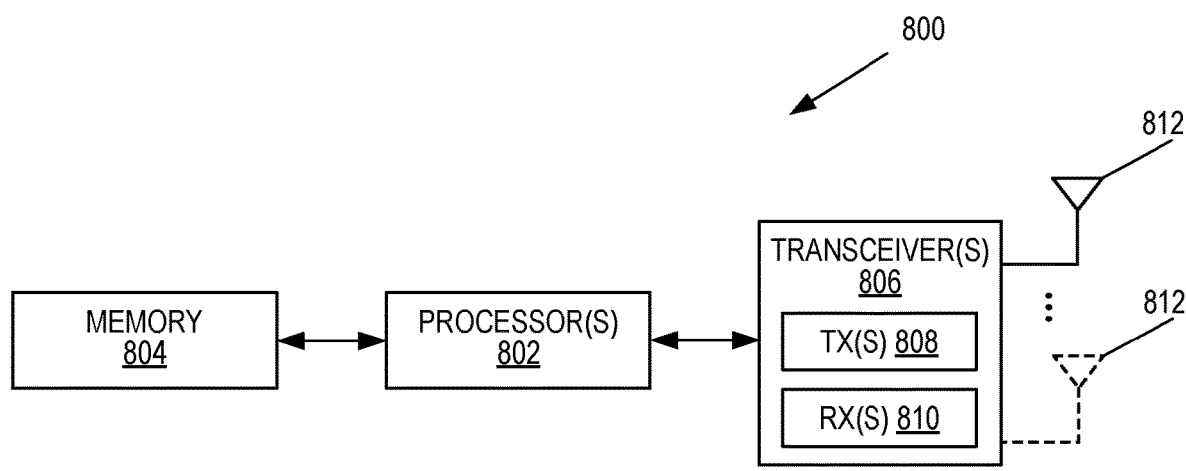
FIG. 8 is a schematic block diagram of a User Equipment (UE) according to some embodiments of the present disclosure.

FIG. 8 is a schematic block diagram of a UE 800 according to some embodiments of the present disclosure. As illustrated, the UE 800 includes one or more processors 802 (e.g., CPUs, ASICs, FPGAs, and/or the like), memory 804, and one or more transceivers 806 each including one or more transmitters 808 and one or more receivers 810 coupled to one or more antennas 812. The transceiver(s) 806 includes radio-front end circuitry connected to the antenna(s) 812 that is configured to condition signals communicated between the antenna(s) 812 and the processor(s) 802, as will be appreciated by on of ordinary skill in the art. The processors 802 are also referred to herein as processing circuitry. The transceivers 806 are also referred to herein as radio circuitry. In some embodiments, the functionality of the UE 800 described above may be fully or partially implemented in software that is, e.g., stored in the memory 804 and executed by the processor(s) 802. Note that the UE 800 may include additional components not illustrated in FIG. 8 such as, e.g., one or more user interface components (e.g., an input/output interface including a display, buttons, a touch screen, a microphone, a speaker(s), and/or the like and/or any other components for allowing input of information into the UE 800 and/or allowing output of information from the UE 800), a power supply (e.g., a battery and associated power circuitry), etc.

In some embodiments, a computer program including instructions which, when executed by at least one processor, causes the at least one processor to carry out the functionality of the UE 800 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 9:
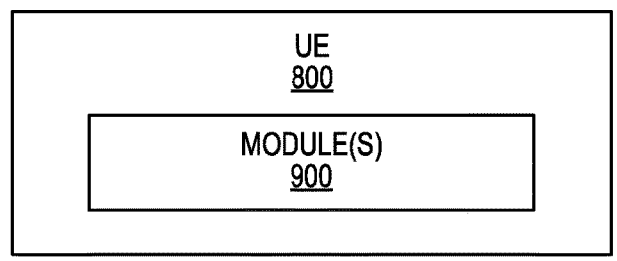
FIG. 9 is a schematic block diagram of the UE of FIG. 8 according to some other embodiments of the present disclosure.

FIG. 9 is a schematic block diagram of the UE 800 according to some other embodiments of the present disclosure. The UE 800 includes one or more modules 900, each of which is implemented in software. The module(s) 900 provide the functionality of the UE 800 described herein.

Figure 10:
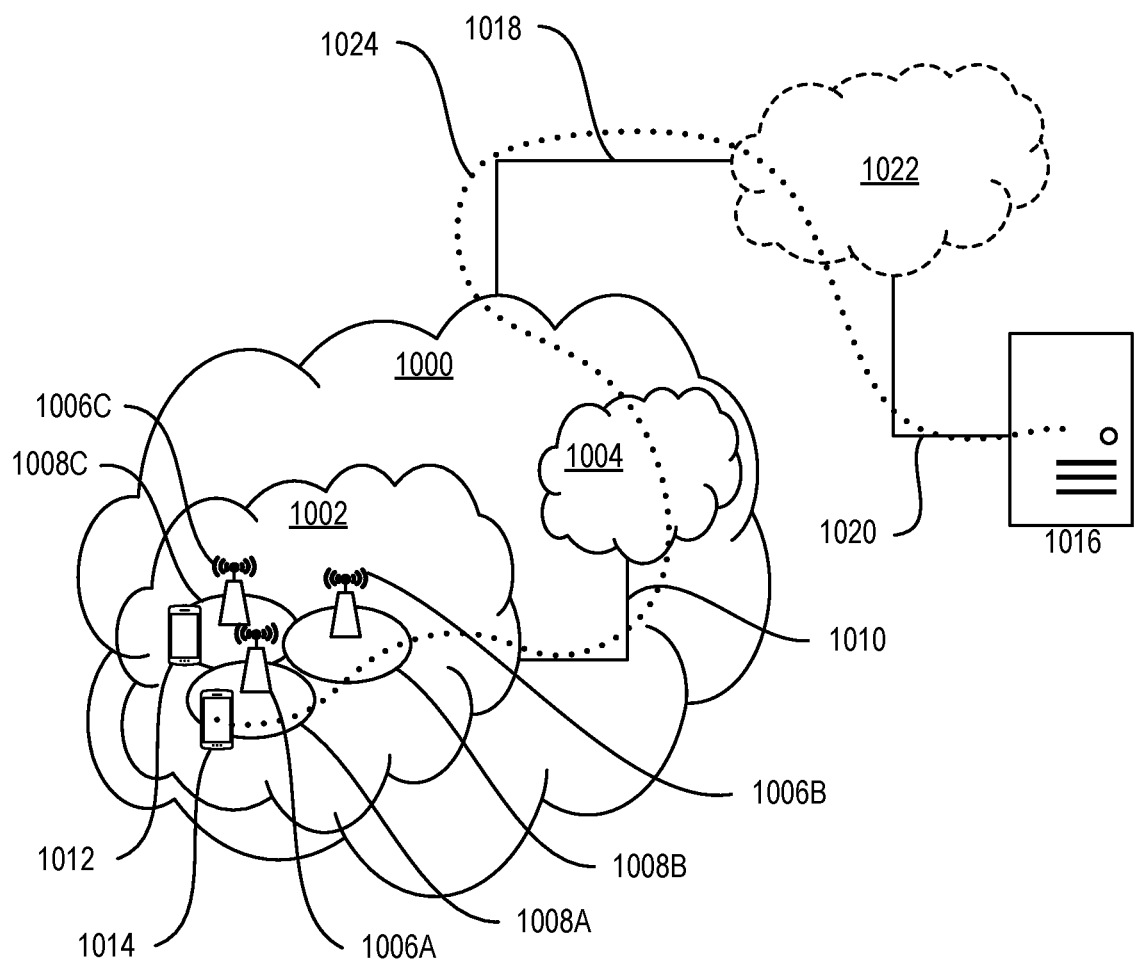
FIG. 10 illustrates a telecommunication network connected via an intermediate network to a host computer in accordance with some embodiments of the present disclosure.

FIG. 10 illustrates a telecommunication network connected via an intermediate network to a host computer in accordance with some embodiments of the present disclosure. With reference to FIG. 10, in accordance with an embodiment, a communication system includes a telecommunication network 1000, such as a 3GPP-type cellular network, which comprises an access network 1002, such as a RAN, and a core network 1004. The access network 1002 comprises a plurality of base stations 1006A, 1006B, 1006C, such as NBs, eNBs, gNBs, or other types of wireless Access Points (APs), each defining a corresponding coverage area 1008A, 1008B, 1008C. Each base station 1006A, 1006B, 1006C is connectable to the core network 1004 over a wired or wireless connection 1010. A first UE 1012 located in coverage area 1008C is configured to wirelessly connect to, or be paged by, the corresponding base station 1006C. A second UE 1014 in coverage area 1008A is wirelessly connectable to the corresponding base station 1006A. While a plurality of UEs 1012, 1014 are illustrated in this example, the disclosed embodiments are equally applicable to a situation where a sole UE is in the coverage area or where a sole UE is connecting to the corresponding base station 1006.

The telecommunication network 1000 is itself connected to a host computer 1016, which may be embodied in the hardware and/or software of a standalone server, a cloud-implemented server, a distributed server, or as processing resources in a server farm. The host computer 1016 may be under the ownership or control of a service provider, or may be operated by the service provider or on behalf of the service provider. Connections 1018 and 1020 between the telecommunication network 1000 and the host computer 1016 may extend directly from the core network 1004 to the host computer 1016 or may go via an optional intermediate network 1022. The intermediate network 1022 may be one of, or a combination of more than one of, a public, private, or hosted network; the intermediate network 1022, if any, may be a backbone network or the Internet; in particular, the intermediate network 1022 may comprise two or more sub-networks (not shown).

The communication system of FIG. 10 as a whole enables connectivity between the connected UEs 1012, 1014 and the host computer 1016. The connectivity may be described as an Over-the-Top (OTT) connection 1024. The host computer 1016 and the connected UEs 1012, 1014 are configured to communicate data and/or signaling via the OTT connection 1024, using the access network 1002, the core network 1004, any intermediate network 1022, and possible further infrastructure (not shown) as intermediaries. The OTT connection 1024 may be transparent in the sense that the participating communication devices through which the OTT connection 1024 passes are unaware of routing of UL and DL communications. For example, the base station 1006 may not or need not be informed about the past routing of an incoming DL communication with data originating from the host computer 1016 to be forwarded (e.g., handed over) to a connected UE 1012. Similarly, the base station 1006 need not be aware of the future routing of an outgoing UL communication originating from the UE 1012 towards the host computer 1016.

Figure 11:
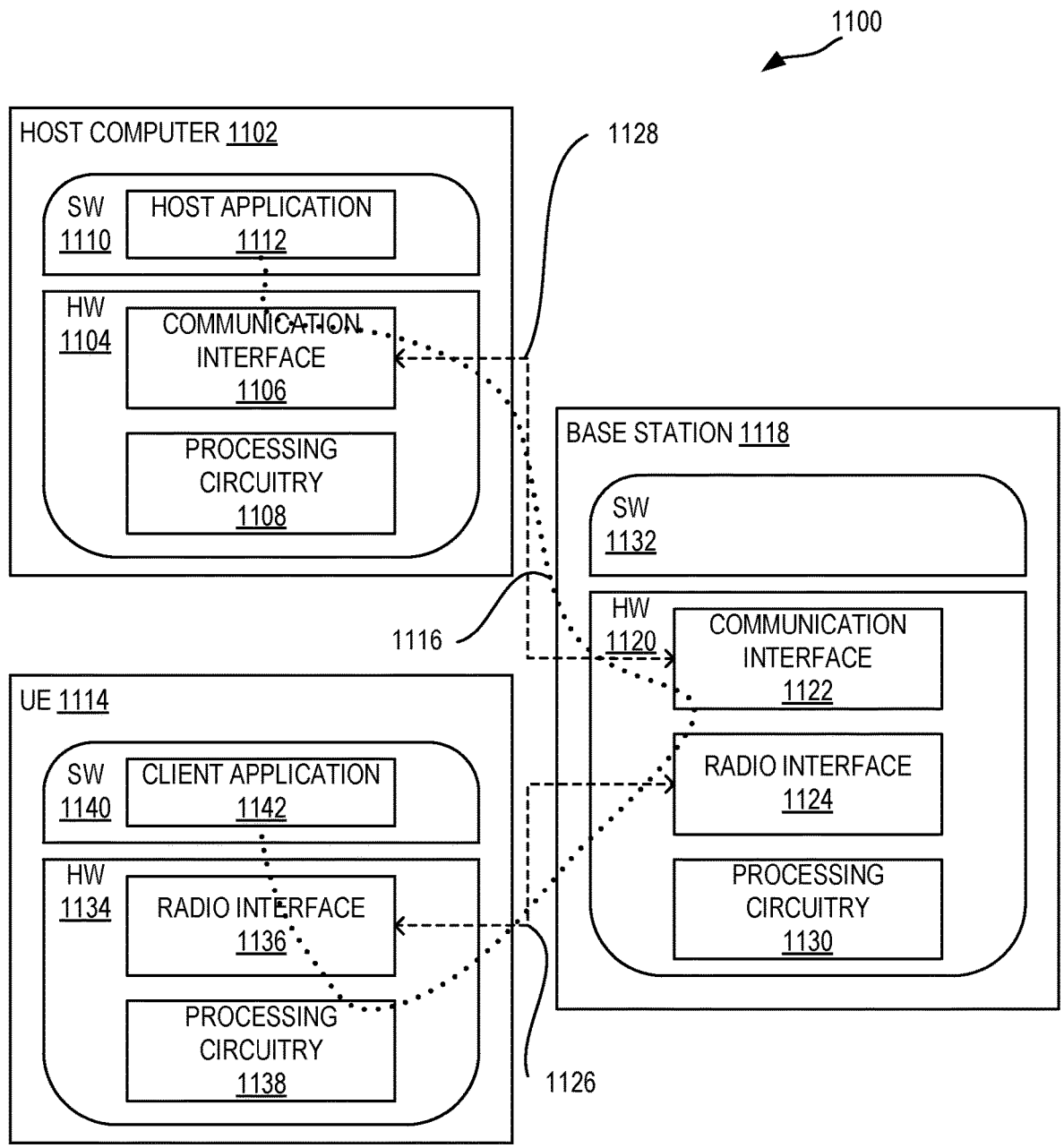
FIG. 11 is a generalized block diagram of a host computer communicating via a base station with a UE over a partially wireless connection in accordance with some embodiments of the present disclosure.

FIG. 11 is a generalized block diagram of a host computer communicating via a base station with a UE over a partially wireless connection in accordance with some embodiments of the present disclosure. Example implementations, in accordance with an embodiment, of the UE, base station, and host computer discussed in the preceding paragraphs will now be described with reference to FIG. 11. In a communication system 1100, a host computer 1102 comprises hardware 1104 including a communication interface 1106 configured to set up and maintain a wired or wireless connection with an interface of a different communication device of the communication system 1100. The host computer 1102 further comprises processing circuitry 1108, which may have storage and/or processing capabilities. In particular, the processing circuitry 1108 may comprise one or more programmable processors, ASICs, FPGAs, or combinations of these (not shown) adapted to execute instructions. The host computer 1102 further comprises software 1110, which is stored in or accessible by the host computer 1102 and executable by the processing circuitry 1108. The software 1110 includes a host application 1112. The host application 1112 may be operable to provide a service to a remote user, such as a UE 1114 connecting via an OTT connection 1116 terminating at the UE 1114 and the host computer 1102. In providing the service to the remote user, the host application 1112 may provide user data which is transmitted using the OTT connection 1116.

The communication system 1100 further includes a base station 1118 provided in a telecommunication system and comprising hardware 1120 enabling it to communicate with the host computer 1102 and with the UE 1114. The hardware 1120 may include a communication interface 1122 for setting up and maintaining a wired or wireless connection with an interface of a different communication device of the communication system 1100, as well as a radio interface 1124 for setting up and maintaining at least a wireless connection 1126 with the UE 1114 located in a coverage area (not shown in FIG. 11) served by the base station 1118. The communication interface 1122 may be configured to facilitate a connection 1128 to the host computer 1102. The connection 1128 may be direct or it may pass through a core network (not shown in FIG. 11) of the telecommunication system and/or through one or more intermediate networks outside the telecommunication system. In the embodiment shown, the hardware 1120 of the base station 1118 further includes processing circuitry 1130, which may comprise one or more programmable processors, ASICs, FPGAs, or combinations of these (not shown) adapted to execute instructions. The base station 1118 further has software 1132 stored internally or accessible via an external connection.

The communication system 1100 further includes the UE 1114 already referred to. The UE's 1114 hardware 1134 may include a radio interface 1136 configured to set up and maintain a wireless connection 1126 with a base station serving a coverage area in which the UE 1114 is currently located. The hardware 1134 of the UE 1114 further includes processing circuitry 1138, which may comprise one or more programmable processors, ASICs, FPGAs, or combinations of these (not shown) adapted to execute instructions. The UE 1114 further comprises software 1140, which is stored in or accessible by the UE 1114 and executable by the processing circuitry 1138. The software 1140 includes a client application 1142. The client application 1142 may be operable to provide a service to a human or non-human user via the UE 1114, with the support of the host computer 1102. In the host computer 1102, the executing host application 1112 may communicate with the executing client application 1142 via the OTT connection 1116 terminating at the UE 1114 and the host computer 1102. In providing the service to the user, the client application 1142 may receive request data from the host application 1112 and provide user data in response to the request data. The OTT connection 1116 may transfer both the request data and the user data. The client application 1142 may interact with the user to generate the user data that it provides.

It is noted that the host computer 1102, the base station 1118, and the UE 1114 illustrated in FIG. 11 may be similar or identical to the host computer 1016, one of the base stations 1006A, 10066, 1006C, and one of the UEs 1012, 1014 of FIG. 10, respectively. This is to say, the inner workings of these entities may be as shown in FIG. 11 and independently, the surrounding network topology may be that of FIG. 10.

In FIG. 11, the OTT connection 1116 has been drawn abstractly to illustrate the communication between the host computer 1102 and the UE 1114 via the base station 1118 without explicit reference to any intermediary devices and the precise routing of messages via these devices. The network infrastructure may determine the routing, which may be configured to hide from the UE 1114 or from the service provider operating the host computer 1102, or both. While the OTT connection 1116 is active, the network infrastructure may further take decisions by which it dynamically changes the routing (e.g., on the basis of load balancing consideration or reconfiguration of the network).

The wireless connection 1126 between the UE 1114 and the base station 1118 is in accordance with the teachings of the embodiments described throughout this disclosure. One or more of the various embodiments improve the performance of OTT services provided to the UE 1114 using the OTT connection 1116, in which the wireless connection 1126 forms the last segment. More precisely, the teachings of these embodiments may improve the selection of a beam index in LTE and 5G systems and thereby provide benefits such as improved communication performance to UEs in general and especially to UEs that are highly mobile and/or that are operating in environments with significant noise or other types of interference.

A measurement procedure may be provided for the purpose of monitoring data rate, latency, and other factors on which the one or more embodiments improve. There may further be an optional network functionality for reconfiguring the OTT connection 1116 between the host computer 1102 and the UE 1114, in response to variations in the measurement results. The measurement procedure and/or the network functionality for reconfiguring the OTT connection 1116 may be implemented in the software 1110 and the hardware 1104 of the host computer 1102 or in the software 1140 and the hardware 1134 of the UE 1114, or both. In some embodiments, sensors (not shown) may be deployed in or in association with communication devices through which the OTT connection 1116 passes; the sensors may participate in the measurement procedure by supplying values of the monitored quantities exemplified above, or supplying values of other physical quantities from which the software 1110, 1140 may compute or estimate the monitored quantities. The reconfiguring of the OTT connection 1116 may include message format, retransmission settings, preferred routing, etc.; the reconfiguring need not affect the base station 1118, and it may be unknown or imperceptible to the base station 1118. Such procedures and functionalities may be known and practiced in the art. In certain embodiments, measurements may involve proprietary UE signaling facilitating the host computer's 1102 measurements of throughput, propagation times, latency, and the like. The measurements may be implemented in that the software 1110 and 1140 causes messages to be transmitted, in particular empty or 'dummy' messages, using the OTT connection 1116 while it monitors propagation times, errors, etc.

Figures 12, 13:
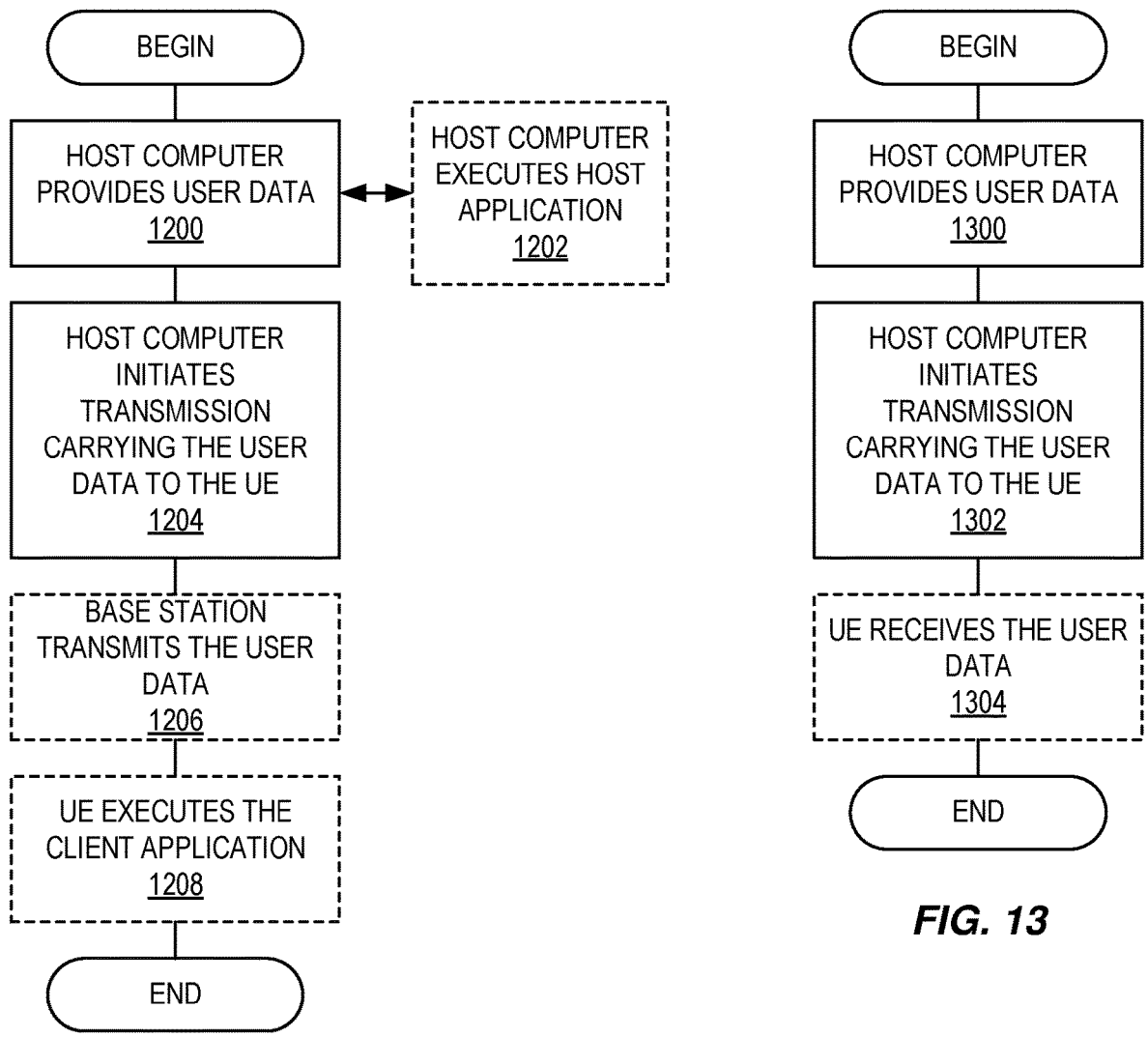
FIG. 12 is a flowchart illustrating a method implemented in a communication system in accordance with one embodiment of the present disclosure.
FIG. 13 is a flowchart illustrating a method implemented in a communication system in accordance with one embodiment of the present disclosure.

FIG. 12 is a flowchart illustrating a method implemented in a communication system, in accordance with one embodiment. The communication system includes a host computer, a base station, and a UE which may be those described with reference to FIGS. 10 and 11. For simplicity of the present disclosure, only drawing references to FIG. 12 will be included in this section. In step 1200, the host computer provides user data. In sub-step 1202 (which may be optional) of step 1200, the host computer provides the user data by executing a host application. In step 1204, the host computer initiates a transmission carrying the user data to the UE. In step 1206 (which may be optional), the base station transmits to the UE the user data which was carried in the transmission that the host computer initiated, in accordance with the teachings of the embodiments described throughout this disclosure. In step 1208 (which may also be optional), the UE executes a client application associated with the host application executed by the host computer.

FIG. 13 is a flowchart illustrating a method implemented in a communication system, in accordance with one embodiment. The communication system includes a host computer, a base station, and a UE which may be those described with reference to FIGS. 10 and 11. For simplicity of the present disclosure, only drawing references to FIG. 13 will be included in this section. In step 1300 of the method, the host computer provides user data. In an optional sub-step (not shown) the host computer provides the user data by executing a host application. In step 1302, the host computer initiates a transmission carrying the user data to the UE. The transmission may pass via the base station, in accordance with the teachings of the embodiments described throughout this disclosure. In step 1304 (which may be optional), the UE receives the user data carried in the transmission.

Figures 14, 15:
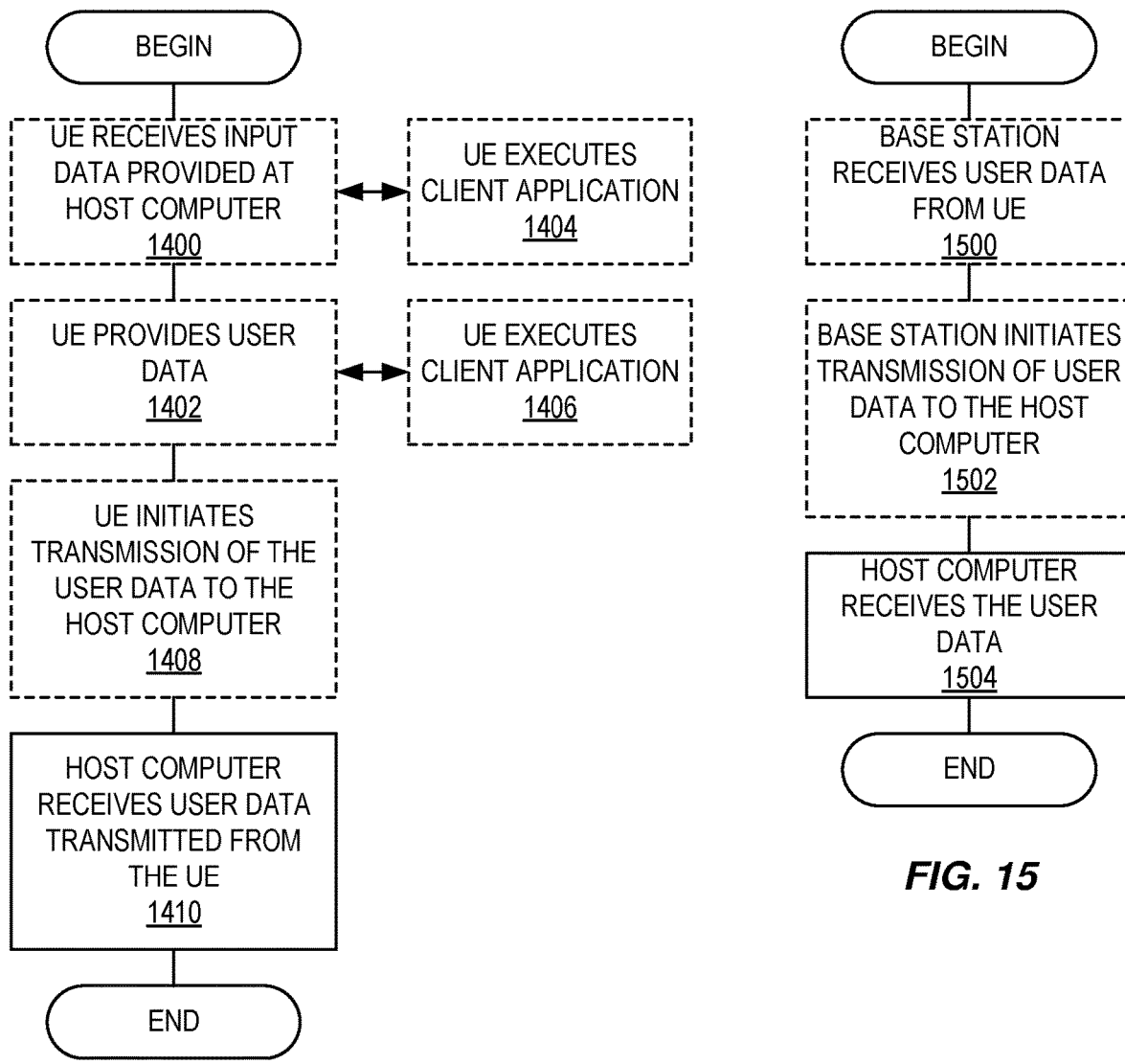
FIG. 14 is a flowchart illustrating a method implemented in a communication system in accordance with one embodiment on the present disclosure.
FIG. 15 is a flowchart illustrating a method implemented in a communication system in accordance with one embodiment of the present disclosure.

FIG. 14 is a flowchart illustrating a method implemented in a communication system, in accordance with one embodiment. The communication system includes a host computer, a base station, and a UE which may be those described with reference to FIGS. 10 and 11. For simplicity of the present disclosure, only drawing references to FIG. 14 will be included in this section. In step 1400 (which may be optional), the UE receives input data provided by the host computer. Additionally or alternatively, in step 1402, the UE provides user data. In sub-step 1404 (which may be optional) of step 1400, the UE provides the user data by executing a client application. In sub-step 1406 (which may be optional) of step 1402, the UE executes a client application which provides the user data in reaction to the received input data provided by the host computer. In providing the user data, the executed client application may further consider user input received from the user. Regardless of the specific manner in which the user data was provided, the UE initiates, in sub-step 1408 (which may be optional), transmission of the user data to the host computer. In step 1410 of the method, the host computer receives the user data transmitted from the UE, in accordance with the teachings of the embodiments described throughout this disclosure.

FIG. 15 is a flowchart illustrating a method implemented in a communication system, in accordance with one embodiment. The communication system includes a host computer, a base station, and a UE which may be those described with reference to FIGS. 10 and 11. For simplicity of the present disclosure, only drawing references to FIG. 15 will be included in this section. In step 1500 (which may be optional), in accordance with the teachings of the embodiments described throughout this disclosure, the base station receives user data from the UE. In step 1502 (which may be optional), the base station initiates transmission of the received user data to the host computer. In step 1504 (which may be optional), the host computer receives the user data carried in the transmission initiated by the base station.

According to another aspect of the present disclosure, a communication system includes a host computer that comprises processing circuitry configured to provide user data and a communication interface configured to forward the user data to a cellular network for transmission to a UE, wherein the cellular network comprises a base station having a radio interface and processing circuitry, the processing circuitry of the base station configured to perform the steps of any of the base station methods described herein. In some embodiments, the system further includes the base station. In some embodiments, the system further includes the UE, wherein the UE is configured to communicate with the base station. In some embodiments, the processing circuitry of the host computer is configured to execute a host application, thereby providing the user data, and the UE comprises processing circuitry configured to execute a client application associated with the host application.

According to another aspect of the present disclosure, a method implemented in a communication system including a host computer, a base station, and a UE, comprises, at the host computer, providing user data; and at the host computer, initiating a transmission carrying the user data to the UE via a cellular network comprising the base station, wherein the base station is configured to perform the steps of any of the base station methods described herein. In some embodiments, the method further comprises, at the base station, transmitting the user data. In some embodiments, the user data is provided at the host computer by executing a host application, and the method further comprises, at the UE, executing a client application associated with the host application.

According to another aspect of the present disclosure, a communication system including a host computer comprises a communication interface configured to receive user data originating from a transmission from a UE to a base station, wherein the base station comprises a radio interface and processing circuitry configured to perform the steps of any of the base station methods described herein. In some embodiments, the system further includes the base station. In some embodiments, the system further includes the UE, wherein the UE is configured to communicate with the base station. In some embodiments, the processing circuitry of the host computer is configured to execute a host application and the UE is configured to execute a client application associated with the host application, thereby providing the user data to be received by the host computer.

According to another aspect of the present disclosure, a method implemented in a communication system including a host computer, a base station, and a UE, comprises, at the UE, initiating a transmission carrying the user data to the host computer via a cellular network comprising the base station, wherein the base station is configured to perform the steps of any of the base station methods described herein; and, at the host computer, receiving the data transmitted by the UE. In some embodiments, the method further comprises, at the base station, receiving the user data from the UE and transmitting the user data to the host computer. In some embodiments, the user data is transmitted from the UE by executing a client application and the data is received at the host computer by executing a host application.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
AP Access Point
ASIC Application Specific Integrated Circuit
BLER Block Error Rate
CPU Central Processing Unit
CSI Channel State Information
DL Downlink
DMRS Demodulation Reference Signal
DSP Digital Signal Processor
eNB Enhanced or Evolved Node B
FDD Frequency Division Duplexing
FIFO First-In, First-Out
FPGA Field Programmable Gate Array
gNB New Radio Base Station
IIR Infinite Impulse Response
IoT Internet of Things
LTE Long Term Evolution MCS Modulation and Coding Scheme
MIMO Multiple Input Multiple Output
MME Mobility Management Entity
M-MIMO Massive Multiple Input Multiple Output
MTC Machine Type Communication
NR New Radio
OTT Over-the-Top
P-GW Packet Data Network Gateway
RAM Random Access Memory
RAN Radio Access Network
RF Radio Frequency
ROM Read Only Memory
RRH Remote Radio Head
SCEF Service Capability Exposure Function
SRS Sounding Reference Signal
TDD Time Division Duplexing
UE User Equipment
UL Uplink Those skilled in the art will recognize improvements and modifications to the embodiments of the present disclosure. All such improvements and modifications are considered within the scope of the concepts disclosed herein.

What is claimed is:

1. A method, performed in a base station in a telecommunications network, for beam index filtering, the method comprising:
   receiving a beam index for a User Equipment, UE;
   storing the received beam index into a queue of length N for storing received beam indexes, N being greater than one;
   selecting a beam index from the queue according to a filtering algorithm; and
   using the selected beam index for transmissions to the UE.

2. The method of claim 1 wherein storing the received beam index into the queue of length N for storing received beam indexes comprises storing the received beam index into a First-In, First-Out, FIFO, of length N.

3. The method of claim 1 wherein selecting the beam index comprises selecting a beam index that appears most often in the queue.

4. The method of claim 3 wherein selecting the beam index that appears most often in the queue comprises determining that more than one beam index appears most often in the queue and selecting, from those beam indexes that appear most often in the queue, a beam index that was most recently added to the queue.

5. The method of claim 1 wherein each entry within the queue is assigned a corresponding weight and wherein selecting the beam index comprises:
   for each entry in the queue, determining a beam index value in that entry, and incrementing a count of a number of times that the beam index value has appeared in the queue during the selection step according to the corresponding weight for that entry; and
   after all entries in the queue have been processed, selecting a beam index with a highest count.

6. The method of claim 5 wherein incrementing the count comprises incrementing the count by a value corresponding to a weight assigned to the queue entry currently being processed.

7. The method of claim 5 wherein each queue entry has a same weight.

8. The method of claim 5 wherein at least one queue entry has a different weight than another queue entry.

9. The method of claim 8 wherein a newer queue entry has a higher weight than an older queue entry.

10. The method of claim 5 further comprising modifying the weight assigned to at least one of the entries within the queue.

11. The method of claim 10 wherein modifying the weight assigned to at least one of the entries within the queue comprises dynamically modifying the weight based on channel conditions.

12. The method of claim 11 wherein dynamically modifying the weight based on channel conditions comprises dynamically modifying the weight based on movement of the UE.

13. The method of claim 1 further comprising initializing the queue prior to storing the received beam index into the queue.

14. The method of claim 13 wherein initializing the queue comprises setting each queue entry to an initialization value.

15. The method of claim 14 wherein setting each queue entry to an initialization value comprises setting each queue entry to a value that is not a beam index value and wherein the initialization values are ignored during the selection step.

16. The method of claim 1 wherein N=9.

17. The method of claim 1 further comprising dynamically changing the length N of the queue based on channel conditions.

18. The method of claim 17 wherein dynamically changing the length N of the queue based on channel conditions comprises dynamically changing the length N of the queue based on movement of the UE.

19. The method of claim 1 wherein receiving the beam index comprises receiving the beam index that was reported from the UE.

20. The method of claim 1 wherein receiving the beam index comprises receiving the beam index that was calculated by the base station based on signals received from the UE.

21. A base station configured to communicate with a User Equipment, UE, the base station comprising a radio interface and processing circuitry configured to:
   receive a beam index for the UE;
   store the received beam index into a queue of length N for storing received beam indexes, N being greater than one;
   select a beam index from the queue according to a filtering algorithm; and
   use the selected beam index for transmissions to the UE.

* * * * *